United States Patent
Moore et al.

(10) Patent No.: US 11,125,017 B2
(45) Date of Patent: Sep. 21, 2021

(54) DIRECTIONAL DRILLER QUALITY REPORTING SYSTEM AND METHOD

(71) Applicant: LANDMARK GRAPHICS CORPORATION, Houston, TX (US)

(72) Inventors: James Wilson Moore, Denver, CO (US); Stephen Robert Holtz, Littleton, CO (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 14/894,992

(22) PCT Filed: Aug. 29, 2014

(86) PCT No.: PCT/US2014/053543
§ 371 (c)(1),
(2) Date: Nov. 30, 2015

(87) PCT Pub. No.: WO2016/032530
PCT Pub. Date: Mar. 3, 2016

(65) Prior Publication Data
US 2016/0291575 A1    Oct. 6, 2016

(51) Int. Cl.
*E21B 7/04* (2006.01)
*E21B 21/08* (2006.01)
(Continued)

(52) U.S. Cl.
CPC ............... *E21B 7/04* (2013.01); *E21B 21/08* (2013.01); *E21B 41/00* (2013.01); *E21B 44/00* (2013.01);
(Continued)

(58) Field of Classification Search
None
See application file for complete search history.

(56) References Cited

U.S. PATENT DOCUMENTS 5,212,635 A     5/1993  Ferriter
5,237,539 A *   8/1993  Selman .................. E21B 44/00
                                                      367/25
(Continued)

FOREIGN PATENT DOCUMENTS

WO     2009039448        3/2009
WO     2009039448 A2     3/2009
(Continued)

OTHER PUBLICATIONS

*Electric Power Group* v. *Alstom* (Case Attached).*
(Continued)

*Primary Examiner* — Catherine T. Rastovski
*Assistant Examiner* — Leonard S Liang
(74) *Attorney, Agent, or Firm* — Locke Lord LLP

(57) ABSTRACT

System and method for analyzing and evaluating the performance of a directional driller ("DD") include acquiring and analyzing drilling data in real time, identifying activities and decisions that are the responsibility of the directional driller, and confirming whether or not the directional driller's decisions were appropriate or not and in what timeframe. The system and method may provide output information for evaluation purposes, for example, in the form of a directional drilling quality report. The directional drilling quality report may allow evaluation of an individual directional driller and also comparison of directional drillers relative to each other. The use of real-time drilling data allows the report to be modified to reflect actual drilling conditions and objectives as needed.

14 Claims, 11 Drawing Sheets

(51) Int. Cl.

| | | |
|---|---|---|
| E21B 45/00 | (2006.01) | |
| E21B 47/024 | (2006.01) | |
| E21B 47/04 | (2012.01) | |
| E21B 47/09 | (2012.01) | |
| E21B 49/00 | (2006.01) | |
| E21B 49/08 | (2006.01) | |
| G01V 11/00 | (2006.01) | |
| G05B 19/406 | (2006.01) | |
| G06Q 10/06 | (2012.01) | |
| E21B 44/00 | (2006.01) | |
| E21B 41/00 | (2006.01) | |
| G05B 19/02 | (2006.01) | |
| E21B 44/02 | (2006.01) | |
| E21B 47/00 | (2012.01) | |
| E21B 44/04 | (2006.01) | |

(52) U.S. Cl.
CPC ............ *E21B 45/00* (2013.01); *E21B 47/024* (2013.01); *E21B 47/04* (2013.01); *E21B 47/09* (2013.01); *E21B 49/003* (2013.01); *E21B 49/08* (2013.01); *G01V 11/002* (2013.01); *G05B 19/02* (2013.01); *G05B 19/406* (2013.01); *G06Q 10/0639* (2013.01); *G06Q 10/06393* (2013.01); *E21B 44/02* (2013.01); *E21B 44/04* (2013.01); *E21B 47/00* (2013.01); *G05B 2219/45129* (2013.01)

(56) References Cited

U.S. PATENT DOCUMENTS

| | | | |
|---|---|---|---|
| 6,206,108 B1* | 3/2001 | MacDonald | E21B 49/005 175/24 |
| 6,233,498 B1 | 5/2001 | King et al. | |
| 6,408,953 B1* | 6/2002 | Goldman | E21B 49/003 175/39 |
| 6,449,572 B1 | 9/2002 | Kurz et al. | |
| 6,735,570 B1 | 5/2004 | Lacy et al. | |
| 6,757,613 B2* | 6/2004 | Chapman | E21B 7/04 345/442 |
| 7,032,689 B2* | 4/2006 | Goldman | E21B 12/02 175/39 |
| 7,085,696 B2* | 8/2006 | King | E21B 7/00 175/40 |
| 7,257,513 B2 | 8/2007 | Lilly | |
| 7,543,658 B2 | 6/2009 | Russell et al. | |
| 7,548,873 B2* | 6/2009 | Veeningen | G06Q 10/06 705/7.12 |
| 7,571,111 B2 | 8/2009 | Ahrens et al. | |
| 7,707,009 B2 | 4/2010 | Steinke | |
| 7,899,658 B2* | 3/2011 | Oliver | E21B 10/00 703/10 |
| 8,210,283 B1* | 7/2012 | Benson | E21B 7/04 175/61 |
| 8,234,153 B2 | 7/2012 | Hecker et al. | |
| 8,244,576 B2 | 8/2012 | Waddington | |
| 8,254,625 B2 | 8/2012 | Coulter et al. | |
| 8,271,531 B2 | 9/2012 | Karlsen et al. | |
| 8,359,221 B2 | 1/2013 | Gala | |
| 8,463,550 B1* | 6/2013 | Selman | E21B 47/022 702/11 |
| 8,510,081 B2 | 8/2013 | Boone et al. | |
| 8,615,364 B1 | 12/2013 | Selman et al. | |
| 8,682,586 B1* | 3/2014 | Selman | G01V 3/18 702/9 |
| 8,701,012 B1* | 4/2014 | Selman | G01V 1/40 715/738 |
| 8,783,382 B2* | 7/2014 | Ignova | E21B 7/04 175/61 |
| 8,892,407 B2* | 11/2014 | Budiman | E21B 47/04 703/10 |
| 10,533,409 B2* | 1/2020 | Benson | E21B 44/02 |
| 2005/0033481 A1* | 2/2005 | Budhraja | H02J 3/008 700/286 |
| 2005/0071120 A1* | 3/2005 | Hutchinson | E21B 44/00 702/150 |
| 2005/0209866 A1* | 9/2005 | Veeningen | G06Q 10/06 705/7.28 |
| 2005/0211468 A1* | 9/2005 | Veeningen | E21B 7/04 175/24 |
| 2005/0236184 A1* | 10/2005 | Veeningen | E21B 10/00 175/40 |
| 2006/0157281 A1* | 7/2006 | Downton | E21B 7/06 175/61 |
| 2006/0185899 A1* | 8/2006 | Alft | E21B 7/06 175/24 |
| 2007/0185696 A1* | 8/2007 | Moran | E21B 44/00 703/10 |
| 2007/0199721 A1* | 8/2007 | Givens | G06Q 10/06 166/382 |
| 2008/0103743 A1* | 5/2008 | Howell | E21B 47/00 703/10 |
| 2008/0156531 A1* | 7/2008 | Boone | E21B 7/06 175/27 |
| 2008/0172272 A1* | 7/2008 | Back | G06Q 10/06 705/7.36 |
| 2008/0173480 A1* | 7/2008 | Annaiyappa | E21B 15/00 175/24 |
| 2008/0179094 A1* | 7/2008 | Repin | E21B 44/00 175/50 |
| 2008/0228830 A1* | 9/2008 | Hawtin | G06Q 10/06 |
| 2008/0289877 A1* | 11/2008 | Nikolakis-Mouchas | E21B 7/04 175/57 |
| 2008/0306803 A1* | 12/2008 | Vaal | E21B 41/00 705/7.26 |
| 2008/0314641 A1* | 12/2008 | McClard | E21B 7/04 175/57 |
| 2009/0078462 A1* | 3/2009 | Boone | E21B 7/04 175/26 |
| 2009/0089028 A1* | 4/2009 | Sagert | E21B 47/00 703/6 |
| 2009/0090555 A1* | 4/2009 | Boone | E21B 7/04 175/45 |
| 2009/0157590 A1* | 6/2009 | Mijares | E21B 43/00 706/61 |
| 2009/0225630 A1* | 9/2009 | Zheng | E21B 47/00 367/81 |
| 2009/0234623 A1* | 9/2009 | Germain | E21B 41/00 703/6 |
| 2009/0250264 A1* | 10/2009 | Dupriest | E21B 7/00 175/40 |
| 2010/0100250 A1 | 4/2010 | Budhraja et al. | |
| 2010/0114493 A1* | 5/2010 | Vestal | E21B 44/00 702/9 |
| 2010/0133008 A1* | 6/2010 | Gawski | E21B 44/02 175/45 |
| 2010/0217530 A1 | 8/2010 | Boone | |
| 2010/0302060 A1* | 12/2010 | Montgomery | G01V 1/26 340/853.7 |
| 2011/0131082 A1 | 6/2011 | Manser et al. | |
| 2011/0307301 A1 | 12/2011 | Laberge et al. | |
| 2013/0144531 A1* | 6/2013 | Johnston | E21B 44/00 702/9 |
| 2013/0161097 A1 | 6/2013 | Benson et al. | |
| 2013/0186687 A1* | 7/2013 | Snyder | E21B 7/04 175/40 |
| 2013/0204674 A1 | 8/2013 | Nathani | |
| 2013/0238404 A1 | 9/2013 | Elias et al. | |
| 2014/0019215 A1 | 1/2014 | Jung et al. | |
| 2014/0039984 A1 | 2/2014 | Sharma et al. | |
| 2014/0277752 A1* | 9/2014 | Chang | E21B 44/00 700/275 |
| 2014/0351183 A1* | 11/2014 | Germain | G06N 20/00 706/12 |
| 2014/0379133 A1* | 12/2014 | Toma | E21B 44/00 700/275 |

(56) References Cited

U.S. PATENT DOCUMENTS

| | | | | |
|---|---|---|---|---|
| 2015/0053483 | A1* | 2/2015 | Mebane, III | E21B 44/00 175/26 |
| 2015/0170087 | A1* | 6/2015 | Johnston | G06Q 10/06316 705/7.26 |
| 2015/0211307 | A1* | 7/2015 | Minosyan | E21B 17/003 166/66 |
| 2015/0346752 | A1* | 12/2015 | Storm | E21B 41/0085 700/297 |
| 2015/0377016 | A1* | 12/2015 | Ahmad | E21B 41/0085 340/855.8 |
| 2016/0305230 | A1* | 10/2016 | Benson | E21B 47/024 |

FOREIGN PATENT DOCUMENTS

| | | |
|---|---|---|
| WO | 2013103976 | 7/2013 |
| WO | 2013103976 A1 | 7/2013 |

OTHER PUBLICATIONS

Mason, C.J., & Chen, D.C.-K. (2006). The Wellbore Quality Scorecard (WQA). Paper prepared for presentation at the IADC/SPE Drilling Conference held in Miami, Florida, U.S.A. Feb. 21-23, 2006. (Year: 2006).*

Abdulmohsen Mohamed Al-Marzouqi. (2010). RTOC Quality and Excellence Assurance for Well Delivery. Paper prepared for presentation at the Abu Dhabi International Petroleum Exhibition & Conference held in Abu Dhabi, UAE, Nov. 1-4, 2010. (Year: 2010).*

Brooker, M.W., Walker M.J., & Brett, J.F. (1995). The Drilled Well Scorecard: A Step to Building a Learning Organization. Paper prepared for presentation at the 1995 SPE/IADC Drilling Conference held in Amsterdam, Feb. 28-Mar. 2, 1995. (Year: 1995).*

International Search Report and Written Opinion dated May 18, 2015.

Canadian Office Action dated Nov. 6, 2018, issued during the prosecution of Canadian Patent Application No. CA 2956139 (4 pages).

Munter, Paul, and Leslie Kren. "The impact of uncertainty and monitoring by the board of directors on incentive system design." Managerial Auditing Journal 10.4 (1995): 23-34.

Ariaratnam, Samuel T. "Quality Assurance/Quality Control Measures in Horizontal Directional Drilling." ICPTT 2009 Advances and Experiences with Pipelines and Trenchless Technology for Water, Sewer, Gas, and Oil Applications. 2009. 1024-1036.

Theys, Philippe P. Log data acquisition and quality control. Editions Technip, 1999.

Theys, "Log data acquisition and quality control," SciTech Connect OSTI ID: 5386657, http://www.osti.gov/scitech/biblio/5386657.

Holzner, R., et al. "Applying microtremor analysis to identify hydrocarbon reservoirs." First Break 23.5 (2005).

Li, Qiming, et al. "New directional electromagnetic tool for proactive geosteering and accurate formation evaluation while drilling." SPWLA 46th Annual Logging Symposium. Society of Petrophysicists and Well-Log Analysts, 2005.

* cited by examiner

| Header information | | | | | | |
|---|---|---|---|---|---|---|
| DD Name | John Driller | | | | | |
| Rig | 109 | | | | | |
| Well | Gusher | | | | | |
| Customer | Big Oil Corporation | | | | | |
| Lat/Long | 51.1788/-1.8262 | | | | | |
| TBD | | | | | | |
| TBD | | | | | | |

1002

| Global Drilling Tolerance Limits | | | Local Drilling Tolerance Limits | | | |
|---|---|---|---|---|---|---|
| Code | Name | Criteria | Pass/Fail | Code | Name | Criteria | Pass/Fail |
| ###### | Item 1 | | Pass | ###### | Count: Poor Drilling Transitions | <3 | Pass |
| ###### | Item 2 | | Pass | ###### | Steering Effectiveness | | Pass |
| ###### | Item 3 | | Pass | ###### | Steering to Plan | | Fail |
| ###### | Item 4 | | Pass | ###### | Steering Timeliness | | Pass |
| ###### | Item 5 | | Pass | ###### | Violate Cooridor E/W | <1 | Pass |
| ###### | Item 6 | | Pass | ###### | Count, Reporting Timelines Out of Spec | | Pass |
| ###### | Item 7 | | Pass | ###### | TBD | | |

1004

| | | | | Customer Tolerance Limits | | | |
|---|---|---|---|---|---|---|---|
| ###### | Item 8 | | Fail | Code | Name | Criteria | Pass/Fail |
| ###### | Item 9 | | Fail | ###### | ROP - Rotating | | Fail |
| ###### | Item 10 | | Pass | ###### | ROP - Sliding | | Pass |
| ###### | Item 11 | | Fail | ###### | Count: Surge and Swab | <2 | Pass |
| ###### | Item 12 | | Pass | ###### | Steering to Plan | "Decisive" | Fail |
| ###### | Item 13 | | Pass | ###### | Differential Pressure | +500 psi | Pass |
| ###### | Item 14 | | Pass | ###### | Motor Stalls | <3 min | Pass |
| ###### | Item 19 | | Fail | ###### | Survey to On-Bottom Drilling Time | | Pass |
| ###### | Item 20 | | Pass | ###### | TBD | | Pass |
| | | | | ###### | TBD | | Pass |
| | | | | ###### | TBD | | |

1008, 1012

| | | | | Well Specific Requirements | | | |
|---|---|---|---|---|---|---|---|
| ###### | Item 21 | | Fail | Code | Name | Criteria | Pass/Fail |
| ###### | Item 22 | | Pass | ###### | Anticollision Avoidance | CF>1.5 | Pass |
| ###### | Item 23 | | Pass | ###### | Curve Build Rates | 6<BR<9 | Fail |
| ###### | Item 24 | | Pass | ###### | Running Speeds While Tripping | <400 fps | Pass |
| ###### | Item 25 | | Pass | ###### | TBD | | Pass |
| ###### | Item 29 | | Pass | ###### | TBD | | |

DIRECTIONAL DRILLER QUALITY REPORTING SYSTEM AND METHOD

TECHNICAL FIELD

The embodiments disclosed herein relate generally to the field of directional drilling, and more particularly to systems and methods for optimizing and evaluating the performance of a directional driller using a performance scoring method including drilling optimization execution, trajectory optimization, well control response, and health, safety, and environmental (HSE) scoring.

BACKGROUND

Performance evaluation in the oil and gas industry often involves unreliable methods, such as word-of-mouth, and competing perspectives, which may not accurately reflect an individual's true performance. For example, there may be conflicts or biases that effect an individual's evaluation. Also, on-site communication of optimum drilling parameters for given conditions may be exaggerated or misestimated due to poor tracking or conventions. Directional drilling is a skilled trade profession much like being an electrician or a plumber. A client or another service company may ask for an action or change that is suboptimal. Examples of suboptimal action or change include: 1) insufficient mud properties for hole cleaning; 2) not enough heavy weight drill pipe available in the correct quantity, inspection class, type, and designed placement; 3) drilling ahead with only one active pump when two are needed; and 4) rotating ahead without steering the wellbore back to the well plan through zones of total lost circulation.

The directional driller's performance from the viewpoint of his/her management and the client is judged by overall directional drilling outcomes that are significantly influenced by the decisions of non-directional drillers. The skill of a lead directional driller touches all parts of a standard RACI (Responsible, Accountable, Consulted, and Informed) chart. Directional drillers are ultimately judged by their ability to influence others through leadership and communication, execute successful drilling outcomes with their skilled trade experience, and be knowledgeable enough to prevent experientially driven negative drilling outcomes.

There are many competing factions that may or may not be interested in the most optimum current drilling decisions. This may be driven by uncontrollable events, availability, failure/reliability, cost, lack of knowledge, etc. Substantively, this can mean that a cell leader directional driller will convince the client or other service companies to spend more money to improve drilling efficiency and reduce total drilling cost. Or the other service companies and the client may "tolerate" certain suboptimal drilling situations. In this situation, the directional driller's performance should be judged by a modified set of outcomes and each set of tolerances may be specifically built into algorithms used in topology optimization.

Other stakeholders who may be skilled in a slightly different art, such as geology, completions, cement, hydraulic fracturing, artificial lift, tool pushing, may have significant influence over the drilling process. These workers with different skill sets do not understand the nuances of the skilled trade of directional drilling even if they have sufficient oilfield experience. This creates an environment that may result in incorrect action/judgment in the wrong timeframe due to lack of knowledge. A good directional driller has to be able to evaluate the accuracy of the information available, convince the other stakeholders to perform the correct action, and act in a decisive timeframe.

Accordingly, a need exists for methods and systems that are able to quantify and qualify an individual's performance and decision-making ability in an objective manner.

BRIEF DESCRIPTION OF DRAWINGS

FIG. 10 is an exemplary main page for the dynamic scorecard according to the disclosed embodiments.

DETAILED DESCRIPTION OF DISCLOSED EMBODIMENTS

Following now is a detailed description of exemplary disclosed embodiments. It will be appreciated that the development of an actual, real commercial application incorporating aspects of the exemplary disclosed embodiments will require many implementation specific decisions to achieve the developer's ultimate gold for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It will also be appreciated that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

In one or more embodiments, the disclosure provides methods and systems for objectively evaluating a directional driller's performance. One or more embodiments disclosed herein may allow evaluation of an individual directional driller and also comparison of directional drillers relative to each other. One implementation of the disclosure comprises computerized performance systems and methods that may be used to quantify and/or qualify an individual's performance and decision-making ability. Information may be collected to corroborate, confirm, evaluate, and analyze a directional driller's performance through the determination of penalty functions. Penalty functions may be weighted equations that output a score or value based on several inputs. The penalty function can be written to reflect different drilling environments and their associated priorities.

Figure 1:
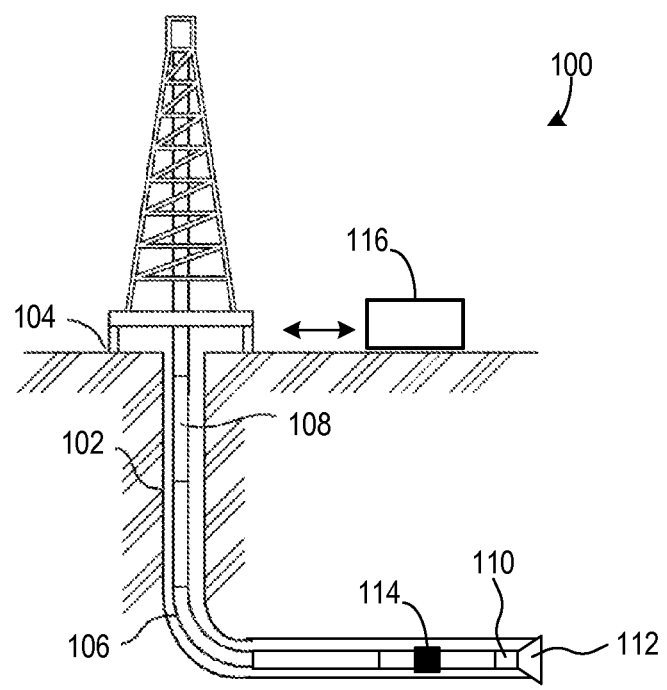
FIG. 1 is an oil or gas drilling rig that may be used to drill a horizontal well according to the disclosed embodiments.

Referring now to FIG. 1, an oil drilling rig 100 is shown that may be used to drill a borehole 102 from a surface location 104, which may be a ground surface, a drilling platform, or any other location outside of the borehole 102 from which drilling may be controlled. The drilling rig 100 has a drill string 106 suspended therefrom composed of a continuous length of assembled pipe segments 108. The drill string 106 typically has a bottom-hole-assembly (BHA) attached at the end thereof that includes a rotary drilling motor 110 connected to a drill bit 112. A non-inclusive list of BHA components includes: drill pipe, heavy-weight drill pipe, drill collars, heavy-weight drill collars, agitators, exciters, jars, stabilizers, reamers, hole openers, filter subs, circulation subs, monel or non-magnetic drill collars, crossovers, an oriented mud motor with a bent housing, the drill bit, etc. One or more downhole sensors 114 are provided for gathering in acquiring data about the status of the directional drilling. The sensors provide data in real time to one or more data systems 116 for storage and subsequent analysis.

The selection, combination, and order of commercially available equipment are designed by the directional driller and drilling engineer to optimize drilling and cost. For example, BHAs are assembled to the proper connection torque on the drilling "rig floor" from parts that are relatively short compared to the measured depth of the well. Note that some BHAs do not include an oriented mud motor for sliding. These BHAs comprise rotary steerable assemblies that are not assisted by a mud motor, and various "dumb iron" assemblies.

On-bottom drilling with an oriented bent housing mud motor is typically performed in one of two fundamental drilling states: rotating or sliding. Rotating drilling refers to when the surface drilling equipment is rotated at a speed, for example, 85 revolutions per minute and the like. Slide drilling occurs when the surface pipe is not rotated continuously. Steering changes may be input in small rotational shifts, for example, quarter turn clockwise/counterclockwise increments. When the drill string is fully wound up due to "reactive torque" at the bit, the directional driller must keep track of the number of total pipe wraps throughout the length of the drill string.

Slide drilling has notorious weight transfer issues that can generally be described as "friction" or drag that may be overcome by oscillating the pipe. As an example, when sliding and controlling a constant steering "tool-face," the directional driller imparts incremental changes to pipe wrap, controlled drilling parameters (Weight-On-Bit (WOB), Differential Pressure, Rate of Penetration, Torque, etc.), and/or oscillation. The ability to perform slide drilling, among other things, allows the trajectory of the drill bit 112 to be controlled to thereby drill in a deviated direction from the previous drilling survey stations. This includes drilling horizontal or lateral sections. For rotary steerable BHAs, slide drilling is not a skill required by the directional driller. However, steering decisions may still be evaluated.

As may be surmised, horizontal well drilling is a costly and time-consuming process. There are multiple tasks and activities that need to be performed in connection with operating the drilling structure 100. Most of these tasks and activities require data in order to be performed and many of them also generate or acquire new data. As such, the embodiments disclosed herein may utilize data mined from various sources via the sensors 114 and data systems 116 to capture accurately key performance indices, time information, and the like, and align it with directional drilling quality reporting, trajectory optimization, well control response, and health, safety, and the environment (HSE) scoring. In one embodiment, the data may be mined, standardized, and corrected, for example, as described in PCT Application No. PCT/US2013/74550 (now U.S. Published Application No. 20160275133), entitled "Double-time Analysis of Oil Rig Activity," filed on Dec. 12, 2013, assigned to Halliburton Energy Services, Inc., and incorporated herein by reference in its entirety. The data collected and corrected may be time aligned so that data from different sources may be correlated together by time. In certain embodiments, time aligning the data may include adjusting manually-logged timestamps for events in work history reports based on real-time data. For example, automatically collected real-time data concerning bit depth may be used to adjust a work-report event timestamp for picking up the bottom-hole assembly. Time alignment decisions may be made using, for example, process map flow charts, probabilistic analysis, and optional manual administrative intervention. In this way, data from various sources, including manually recorded data, may be time aligned with the real-time data and an accurate reconstruction of work history may be generated. Such data mining allows automatic analysis of raw and/or corrected performance data in comparison to a set of rules. The data may then be used to objectively evaluate a directional driller's operational performance according to embodiments disclosed herein.

In one implementation, an evaluation report may be automatically generated for the directional driller, including a cover page listing "pass/fail" criteria. The criteria may be color coded according to certain categories of tasks related to the drilling process. Detection of any performance non-conformity of the drilling process, such as out of acceptable tolerances, failure to comply with specifications, ranges, or rules may be flagged as "fail." The results may be assembled in a database and used to generate an objective performance report for the directional driller according to embodiments disclosed herein.

In some implementations, the report will not automatically generate all available pages. Rather, some pages may only populate on demand, for example, to support a failed criterion listed on the first page of the report. Of course, these support pages may also be populated for the passing criteria listed on the first page of the report. In either case, such an arrangement allows for extremely quick human processing at-a-glance. A reviewer then need only read the supporting pages as desired, which may comprise, for example, excerpts from drilling logs, statistical analysis of performance non-conformity, and so forth.

Performance of a directional driller may be graded as, for example, overactive, decisive, reactive, delayed action, or negligent. A directional driller's ability to comply with standards defined by the customer/client and any regulations such as a tolerance or specification matrix, may be graded, for example, as exceeds, meets, below, or far below expectations in each category. A directional driller's ability to follow the well plan may be analyzed by using topology optimization, such as gradients, divergence, curl, or penalty functions, with regard to the well plan and any customer tolerances or specification index.

Each of the individual skills needed to perform the job of directional driller may be evaluated on a quantitative and qualitative basis using one or more embodiments disclosed herein. The metrics used in the evaluation may be presented on a per shift, per run, per section, per well, etc., basis in a directional driller's scorecard according to the embodiments disclosed herein.

Importantly, the performance evaluations embodiments disclosed herein have the ability to identify and dynamically adjust the metrics (i.e., activities, decisions, etc.) to be measured and their pass/fail criteria using actual drilling data. Existing solutions are essentially static in that, for a given driller, a predefined list of metrics is tracked and only the delta or difference between the actual results and predefined targets are measured. The performance evaluations embodiments disclosed herein are dynamic in that they can acquire and analyze drilling data and automatically identify key metrics that should be measured and their pass/fail criteria. This allows the performance evaluations to account for any needed changes to the drilling process based on the drilling data.

As discussed in the above reference PCT application, data may be mined from a wide variety of data acquisition sources via the sensors 114 and data systems 116. The data may include measurement while drilling ("MWD") information, such as the survey inclination, survey azimuth, survey depth, tool face (magnetic and gravity), and vibration measurements. The data may also include logging while drilling ("LWD") data. LWD data may include gamma measurements, pressure while drilling, sonic measurements, resistivity (including directional resistivity), nuclear (or pulse nuclear generator), density, porosity, photoelectric effect information, and downhole fluid analysis data.

Other information that may be used in the embodiments disclosed herein includes company representative information. This may include reports, guidelines provided by the company representative, the tolerances that are acceptable on a particular directional drilling job, and basic requirements of the job. In addition, the data acquired may include data from the mud engineer, geologist's interpretation and plans, and the directional driller's reports. The directional driller's reports may include slide data, a rotate direction and length (weight-to-weight), time breakdown, bottom-hole-assembly (BHA) report, and BHA type (including motor, rotary steerable system, and rotary). It may also include data from agitators, such as shock subs, jars, and the like to the extent that these devices provide data that may be captured by the system. The planned well trajectory, seismic data, and offset well data are also categories of data that may be acquired by the system.

Data mined for use in the disclosed embodiments may also include drilling reports, such as daily IADC (International Association of Drilling Contractors) reports, time logs, parameter measurements, the driller's table, including slack-off weight, rotating off bottom weight, pick-up weight, drag-up, drag-down, and other similar reports that may be available to a directional driller on a particular drilling site.

In some embodiments, data from the various sources may be automatically cross-checked and any differences reported. Variances that are identified may be arranged in a priority sequence for the reader. Data that may be cross-checked includes whether slides are performed in the direction that was reported on the slide sheet, or whether slides were performed in a logical direction. For example, whether the slide was performed at or near the planned kick-off point, and whether the slide pointed in the planned kick-off point direction. The cross-check may also include whether the motor is oriented to steer back to the line or away from the line. With a rotary steerable system, the disclosed embodiments would track steering commands. As the proper timing of steering action is up for discussion, the disclosed embodiments look for actions that show a trend in behavior that is productive or counterproductive with regard to several key performance indicators, such as time, cost, number of bottom hole assemblies, wellbore tortuosity, etc.

Other data that may be checked include whether slides are performed through a logical length. This may involve forward and backward Ragland method (in non-vertical hole) using "weight to weight" depths to determine the actual build rate in rotation, turn rate in rotation, and motor output. More importantly, whether the "weight-to-weight" slide, broken out from the Ragland method, an appropriate distance to steer back to the line without creating an excessive dogleg. A statistical analysis may also be used to provide a range of acceptable slide lengths. The method may also account for the customer tolerance for deviation from the plan. Still additional data that may be cross-checked by the method includes whether reported slide lengths match those identified from the surface data, whether reported survey depth matches the actual survey depth, whether the reported weight on bit RPM and flow matches the actual values, and whether the record of down-lengths for rotary-steerable tools was applied successfully when needed to meet objectives.

The embodiments disclosed herein may also identify when the bottom-hole-assembly (BHA) is being oriented for a slide. These embodiments may capture the length of time required to orient for each slide and record this as a performance metric. The time required to orient for a slide may be reported graphically by time of day, bit measured depth, inclination, and as a distribution.

The number of times the BHA must be reoriented in order to complete a slide may also be counted and reported graphically by time of day, bit measured depth, inclination, and distribution. The target tool face direction may be compared to the actual reported tool face and the percentage of "good slide" may be calculated for each slide made. Percentage of "good slides" may be reported graphically, again by time of day, bit measure depth, inclination and distribution. In one implementation, the method may create a rosebud diagram that can use the Ragland method to accurately predict the outcome of slides given a corrected slide sheet. For example, if the standard deviation of the slide tool face was precise, but not accurate, embodiments disclosed herein may use trigonometric calculations to modify the expected outcome.

In some embodiments, where sensor improvements are widely available, the number of wraps and the amount of compression in the drill pipe may be used, which may be calculated. Alternately, this information may be tracked by using the "music sheet" method of keeping track of WOB, differential pressure, tool face, torque, oscillation settings, wraps in the drill pipe required to maintain tool face (reactive torque), and the time to propagate wraps for wrap changes downhole. In other embodiments, the music sheet is closely tracked. Making the music sheet automated, standardized, and quality-controlled may contribute to repeatable success in directional drilling. Changes during a twelve-hour tour are often significant enough to warrant completely different optimized drilling procedures. Directional drillers must expect that the optimized drilling parameters may change during their off-tour shift. The report generated according to the disclosed embodiments makes this information available to the directional driller and reduces the burden of shift handover notes and allows the directional driller to focus more clearly on the job of drilling execution, rather than reporting and data entry. This also aids onsite communication of optimum drilling parameters for given conditions.

The embodiments disclosed herein may also identify events that are potentially harmful to the bottom-hole-assembly and its components. Once these events are identified, the disclosed embodiments may search for evidence of correct responses from the directional driller. Correct changes to drilling parameters and drilling practices may be reported as success while failure to react to harmful conditions, such as vibration, motor stalls, reaming through high dog legs, etc., may be reported as a directional driller failure.

Where directional driller failures are identified, they can be analyzed individually, as a group, chronologically, or by failure type. Where a series of failures occur in a short period, the disclosed system and method may automatically group them in order to be concise in reporting.

Data relevant to directional driller failures may be extracted from the database and presented for replay or further analysis, review, and/or training One or more embodiments may also give the user an option to override directional driller failures individually or as a group if the user believes that there is, in fact, no failure. In another embodiment, the system and method may also scan the directional driller's reports, which may include motor performance reports, run reports, VHE reports, daily reports, and end of well reports, and may count the number of fields that are left blank. The number of blank fields may be reported to determine whether the directional driller entered sufficient information in the required reports.

In still further embodiments, the data mined for use in the disclosed system and method may include pick-up weight, slack-off weight, and rotate-off-bottom string weight, pipe squat, pipe wraps, weight-to-weight slides, and so forth. If drilling procedures were poor, statistical envelopes may be used to predict missing terms if, for example, the driller failed to rotate off bottom after his slide and before rotating.

Once all desired data has been collected, the directional driller's performance may be evaluated dynamically according to the embodiments disclosed herein. An example of a dynamic evaluation or scorecard system that may be used to provide objective performance evaluation of directional drillers according to the disclosed embodiments is depicted generally at 200 in FIG. 2.

Figure 2:
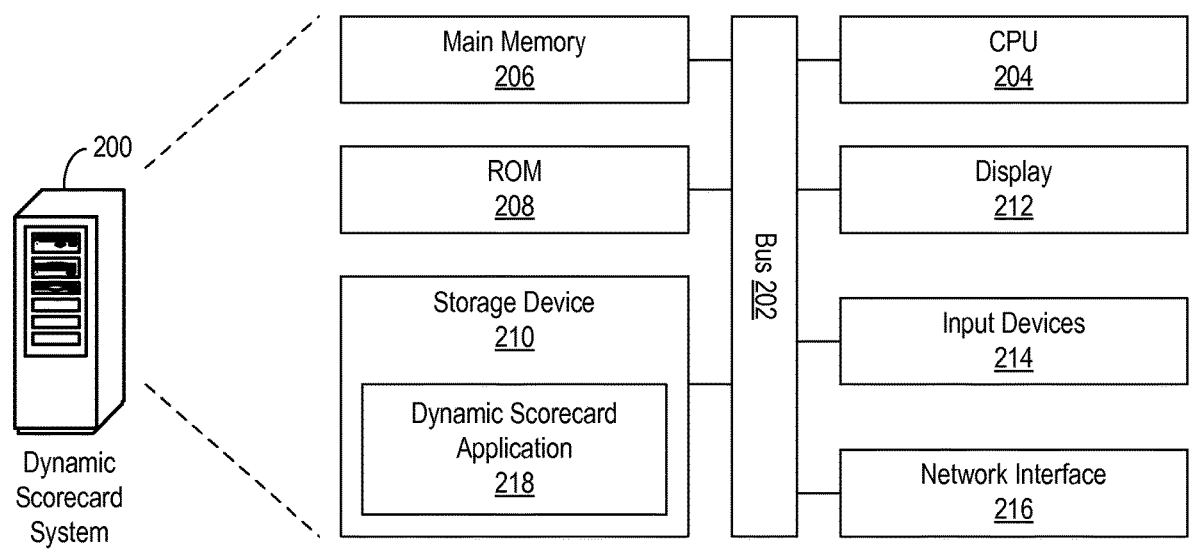
FIG. 2 is an exemplary dynamic scorecard system that may be used for objective performance evaluation of directional drillers according to the disclosed embodiments.

As seen in FIG. 2, the exemplary dynamic scorecard system 200 may be a conventional workstation, desktop, or laptop computer, or it may be a custom computing system developed for a particular application. In a typical arrangement, the system 200 includes a bus 202 or other communication pathway for transferring information within the dynamic scorecard system 200, and a CPU 204 coupled with the bus 202 for processing the information. The dynamic scorecard system 200 may also include a main memory 206, such as a random access memory (RAM) or other dynamic storage device coupled to the bus 202 for storing computer-readable instructions to be executed by the CPU 204. The main memory 206 may also be used for storing temporary variables or other intermediate information during execution of the instructions to be executed by the CPU 204. The dynamic scorecard system 200 may further include a read-only memory (ROM) 208 or other static storage device coupled to the bus 202 for storing static information and instructions for the CPU 204. A computer-readable storage device 210, such as a nonvolatile memory (e.g., Flash memory) drive or magnetic disk, may be coupled to the bus 202 for storing information and instructions for the CPU 204. The CPU 204 may also be coupled via the bus 202 to a display 212 for displaying information to a user. One or more input devices 214, including alphanumeric and other keyboards, mouse, trackball, cursor direction keys, and so forth, may be coupled to the bus 202 for communicating information and command selections to the CPU 204. A communications interface 216 may be provided for allowing the dynamic scorecard system 200 to communicate with an external system or network.

The term "computer-readable instructions" as used above refers to any instructions that may be performed by the CPU 204 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission itself may take the form of electromagnetic, acoustic or light waves, such as those generated during radio frequency (RF) and infrared (IR) data communications. Common forms of computer-readable media may include, for example, magnetic medium, optical medium, memory chip, and any other medium from which a computer can read.

In accordance with the disclosed embodiments, a dynamic scorecard application 218, or rather the computer-readable instructions therefor, may also reside on or be downloaded to the storage device 210. In general, the dynamic scorecard application 218 is a computer program that substantially implements the concepts and principles disclosed herein. The computer program may be executed by the CPU 204 and/or other components of the dynamic scorecard system 200 to generate a model or analysis of the drill string operation. Such a dynamic scorecard application 218 may be written in any suitable computer programming language known to those having ordinary skill in the art using any suitable software development environment known to those having ordinary skill in the art. Examples of suitable programming languages may include C, C++, C #, FORTRAN, MATLAB (from The MathWorks, Inc.), and LabVIEW (from National Instruments, Inc.), and the like. Examples of suitable software development environments include Visual Studio from Microsoft Corporation, and the like.

Figure 3:
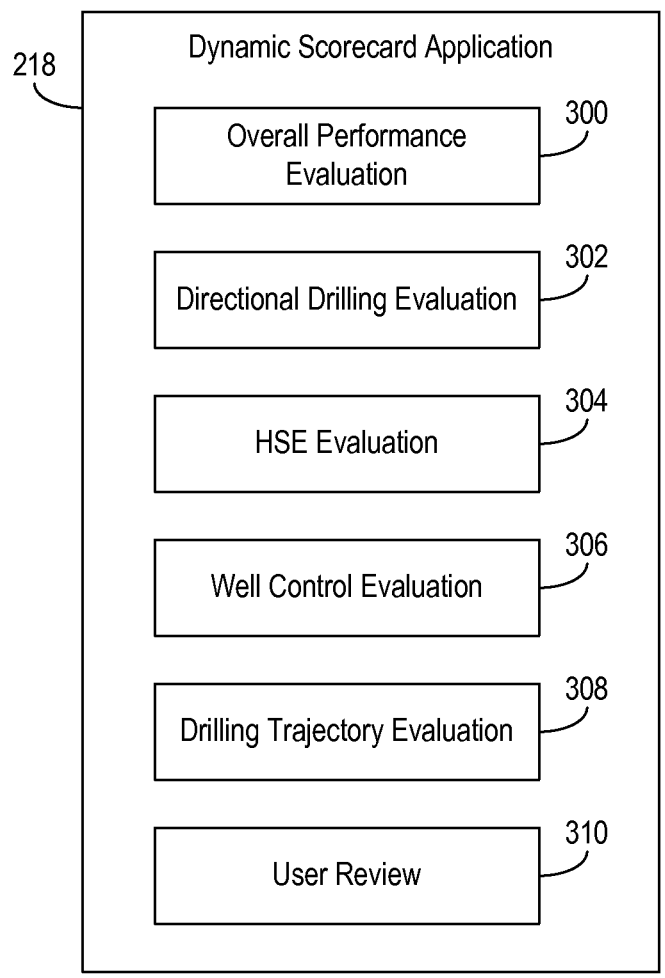
FIG. 3 is an exemplary dynamic scorecard application that may be used for objective performance evaluation of directional drillers according to the disclosed embodiments.

FIG. 3 illustrates the dynamic scorecard application 218 in more detail according to the disclosed embodiments. As can be seen, the dynamic scorecard application 218 has a number of functional modules designed to provide objective evaluations for various aspects of the directional drilling process. In the embodiment shown here, the dynamic scorecard application 218 includes an overall performance evaluation module 300, a directional drilling evaluation module 302, a health, safety, and environmental evaluation (HSE) module 304, a well control evaluation module 306, a drilling trajectory evaluation module 308, and a user review module 310. Although the various modules 300-310 are depicted as discrete blocks, it should be understood that any block may be divided into two more constituent blocks, and that two or more blocks may be combined to form a single block, without departing from the scope of the exemplary disclosed embodiments. Following is a description of the operation of the various functional modules 300-310.

Figure 4:
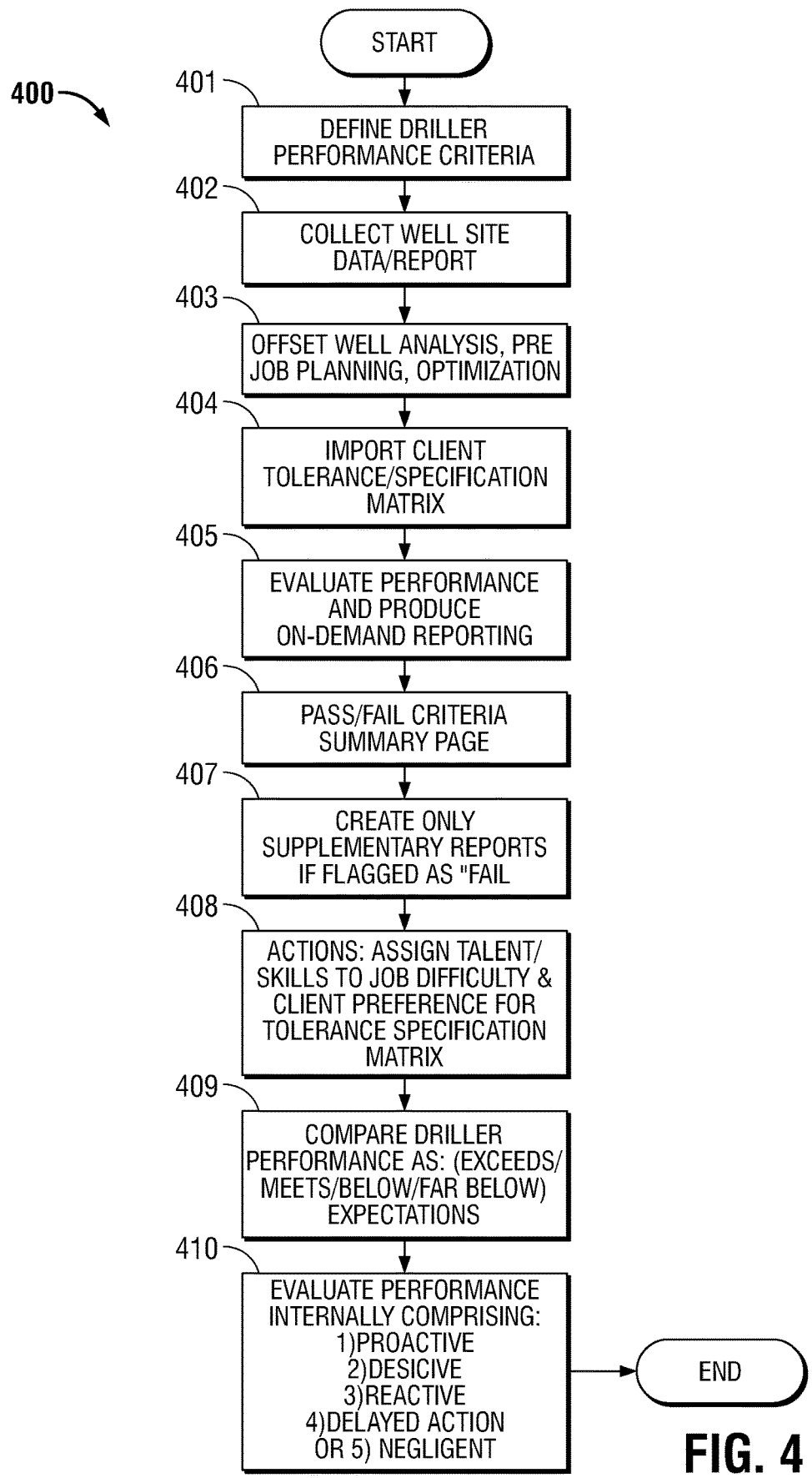
FIG. 4 is an exemplary overall evaluation process of the dynamic scorecard according to the disclosed embodiments.

Operation of the overall performance evaluation module 300 of the dynamic scorecard application is shown in FIG. 4 via a flow diagram 400. The first step in the overall performance evaluation flow diagram 400 is to define at block 401 a list or set of performance criteria, or performance matrix, for the directional driller. Such driller performance criteria may include any of the driller performance criteria mentioned herein and may be an existing predefined set of criteria or they may be defined anew. At block 402, the dynamic scorecard application automatically retrieve and analyze the data that will be mined for use in the evaluation of the directional driller. This is shown in block 402 and may be performed, for example, using the systems and processes described in PCT Application No. PCT/US2013/74550 mentioned above. In block 403, the data retrieved may be related to, for example, the offset well analysis, pre-job planning, and optimization. Next, in block 404, the customer's/client's tolerance and specification matrix is defined, generated, or otherwise imported into the dynamic scorecard application. This information is typically provided by the customer/client and may include information that is unique to the particular customer's/client's goals and requirements regarding how closely the directional driller must track the well plan and other demands related to a particular job. Next, in block 405, the driller's actual performance is evaluated and an evaluation report may be produced on-demand detailing how well the driller met the customer's/client's requirements. In block 406, a section of the report is created that lists the pass/fail criteria and summarizes the overall directional driller's performance for a quick and accurate review by an evaluator. In block 407, the dynamic scorecard application creates supplemental reports if any of the criteria are flagged as "fail" by the overall performance evaluation module. For any categories in which the directional driller failed, the supplemental reports provide additional detail explaining the reasons for the failure. In this way, an evaluator can quickly see only the problem areas that need to be addressed. In block 408, the dynamic scorecard application generates a report showing the actions that may be taken for a given directional driller. For example, the report may generate information allowing a particular driller to be matched according to his talent and skills to a particular job difficulty or customer/client preference or tolerance for certain specifications.

In block 409, the dynamic scorecard application then provides a formal evaluation for the directional driller and rates his performance as, for example, exceeds, meets, falls below, or falls far below expectations for that particular driller. Of course, other rating systems besides the one disclosed herein may be used without departing from the scope of the disclosed embodiments. In block 410, the report generated by the dynamic scorecard application may then be internally evaluated and used for different internal purposes, such as determining whether a particular driller is considered overactive, decisive, reactive, whether he has delayed actions, or whether he is negligent. This performance rating can then be used for various purposes such as promotion or compensation decisions and determining whether a particular driller needs additional training or experience in certain areas. The rating system in block 410 may be thought of as a matrix in which the directional driller's performance regarding directional control, HSE, well control, and trajectory control, may each individually be evaluated as to whether it is pro-active, decisive, reactive, delayed action, or negligent. These categories are discussed more specifically with respect FIGS. 5-8.

Figure 5:
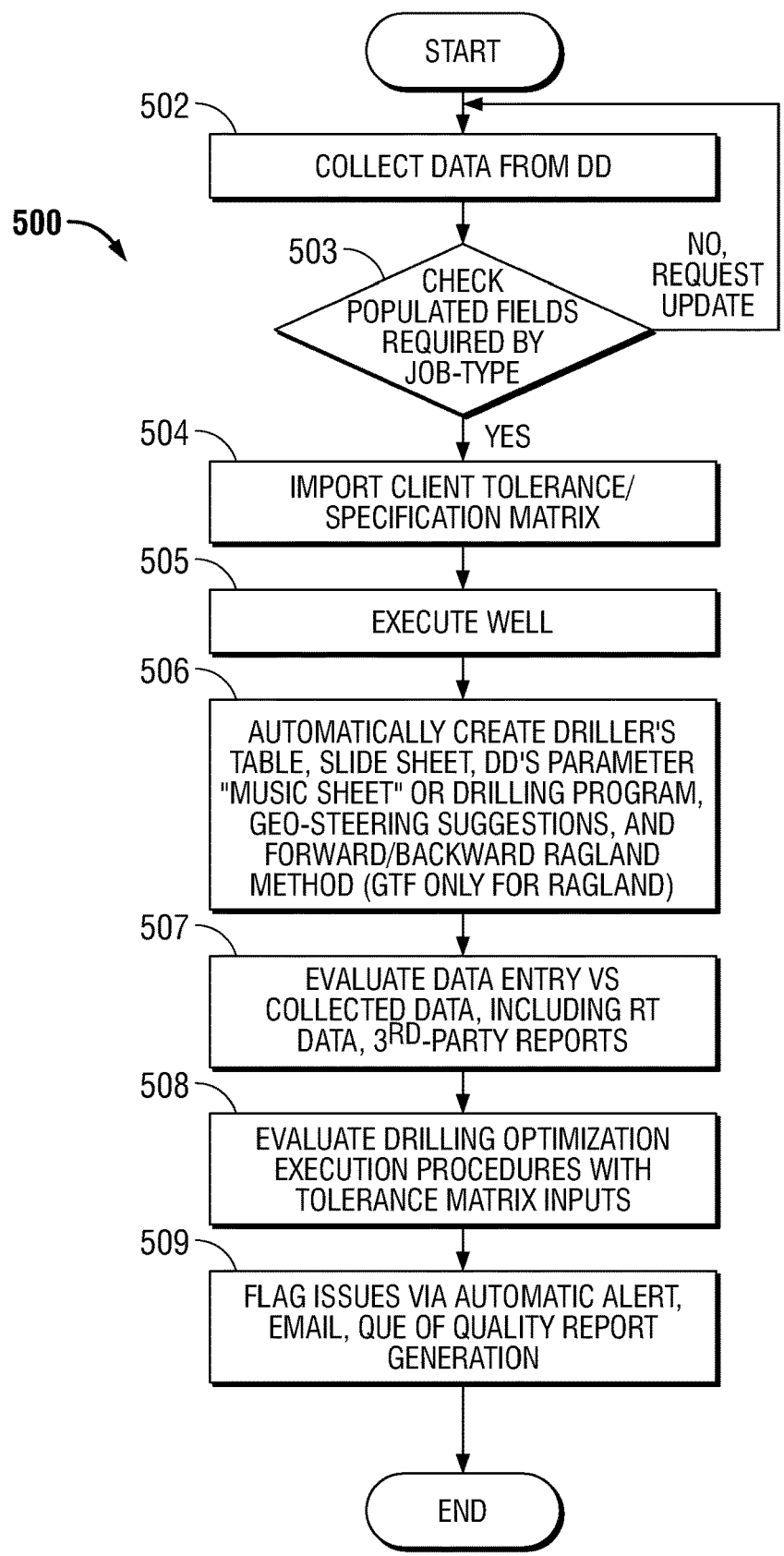
FIG. 5 is an exemplary directional drilling evaluation process of the dynamic scorecard according to the disclosed embodiments.

Referring now to FIG. 5, operation of the directional drilling evaluation module 302 of the dynamic scorecard application is shown via a directional drilling flow diagram 500. The directional drilling performance flow diagram 500 begins by collecting data using PCT Application No. PCT/US2013/74550, from the directional driller in block 502. In block 503, the dynamic scorecard application determines whether the required fields for data sufficiency in the directional driller's reports for a given job type have been properly populated. If the answer at block 503 is no, then the dynamic scorecard application returns to block 502 and additional information for the fields is collected from the raw data using methods comprising the Naïve Bayes Classifier, statistical methods, etc., to determine expected values for missing or obviously incorrect information. This method is outlined in the above PCT application. When the fields are populated as required, the dynamic scorecard application proceeds to block 504 and imports the customer's/client's tolerance/specification matrix. In block 505, the dynamic scorecard application executes evaluation of performance process. The dynamic scorecard application then proceeds to block 506 where it may automatically create the driller's table, slide sheet, directional driller's parameter "music sheet" or drilling program, geo-steering suggestions, and forward/backward Ragland method. Once these are automatically created in block 506, the dynamic scorecard application proceeds to block 507 where the data collected is evaluated by comparing it against real-time data automatically obtained, for example, using the systems and processes described in PCT Application No. PCT/US2013/74550 mentioned above. The dynamic scorecard application then proceeds to block 508 where it evaluates drilling optimization execution procedures with tolerance matrix inputs. In block 509, the evaluations in blocks 507 and 508 are used to flag issues and provide automatic alerts, emails, and to generate the quality report showing the driller's performance in these issues.

Figure 6:
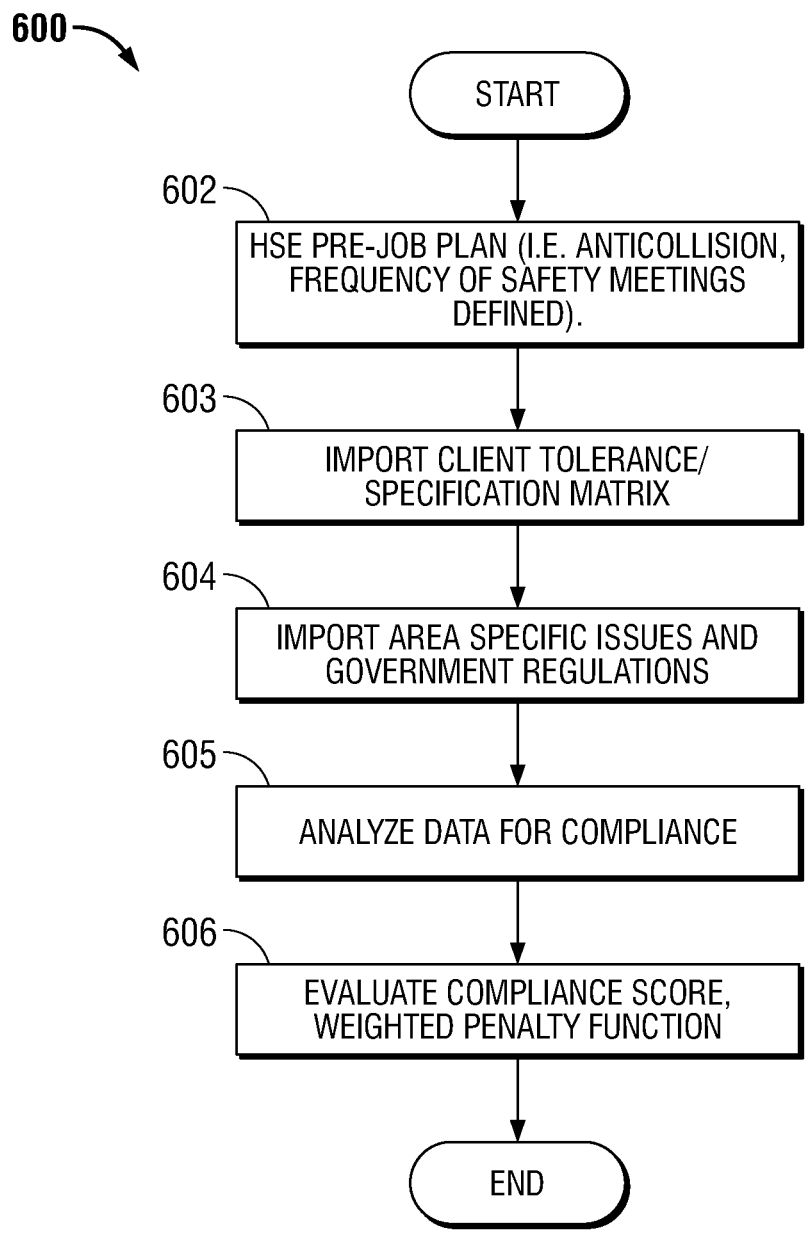
FIG. 6 is an exemplary HSE evaluation process of the dynamic scorecard according to the disclosed embodiments.

FIG. 6 illustrates operation of the HSE evaluation module 304 of the dynamic scorecard application via a flow diagram 600. Operation of this evaluation module begins at block 602 where the HSE pre job plan, such as anti-collision, frequency of safety meetings and the like are imported into the dynamic scorecard application. In block 603, the dynamic scorecard application imports a customer/client's tolerance/specification matrix regarding HSE requirements. In block 604, the dynamic scorecard application imports various, specific issues and government regulations. In block 605, the driller's performance is compared to the data imported in blocks 602-604. The dynamic scorecard application then proceeds to block 606 where it evaluates the driller's compliance with the HSE requirements and populates a weighted penalty function that is derived from the customer tolerance and technical difficulties of the well which may include variations of the Drilling Difficultly Index.

Figure 7:
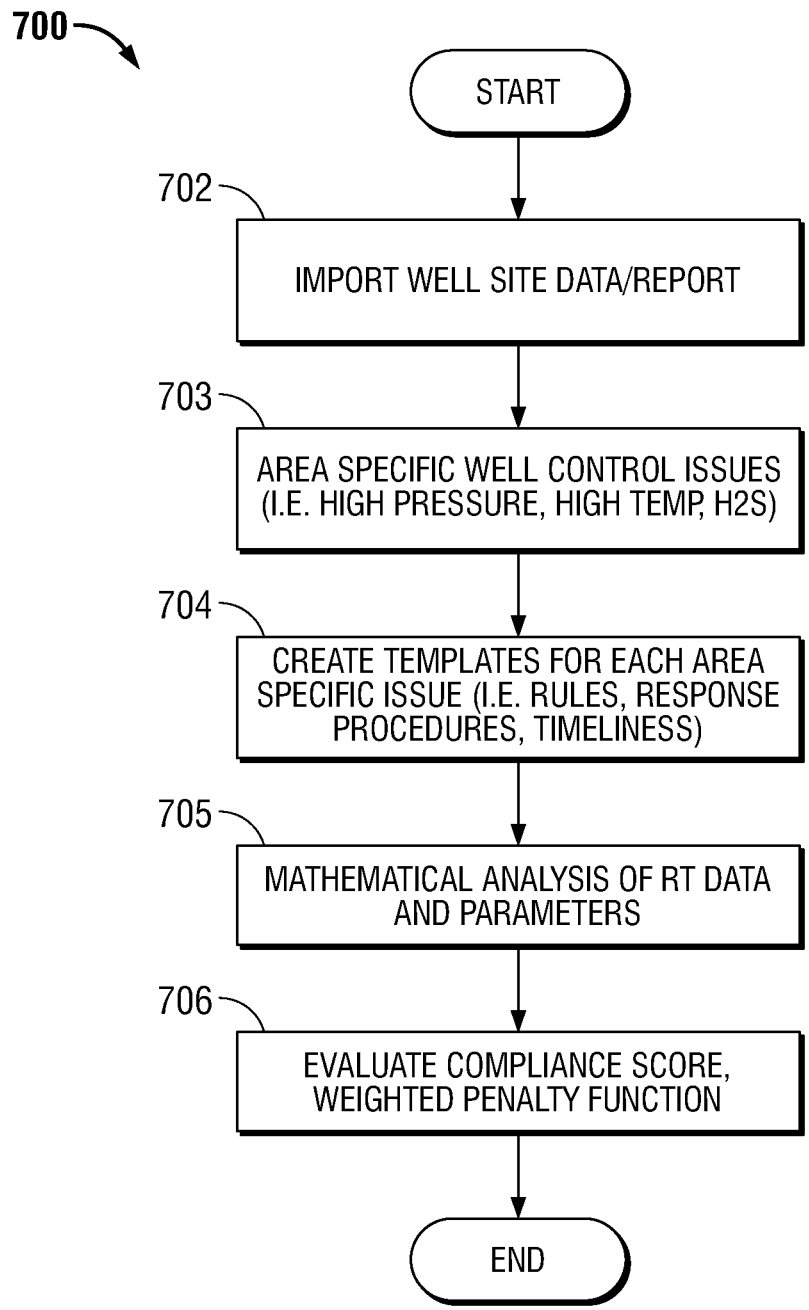
FIG. 7 is an exemplary well control evaluation process of the dynamic scorecard according to the disclosed embodiments.

FIG. 7 illustrates operation of the well control evaluation module 306 of the dynamic scorecard application via a flow diagram 700. Operation of this evaluation module begins at block 702 where data mined from the various sources as discussed earlier is imported into the dynamic scorecard application. At block 703, data pertaining to area specific well control issues, such as high pressure, high temperature, $H_2S$ control, are input into the dynamic scorecard application. In block 704, a template is created for each area's specific issue, including the rules, responses, procedures, and time lines. In block 705, a mathematical analysis of real-time data and parameters is performed. The mathematical analysis may be based upon known optimization techniques and formulas, such as weighted penalty functions and statistical analysis. The dynamic scorecard application then proceeds to block 706 in which the directional driller's compliance is evaluated and he is assigned a weighted penalty function, depending on how well he maintained the well performance within the required parameters. And this information may be used in the scorecard report.

Figure 8:
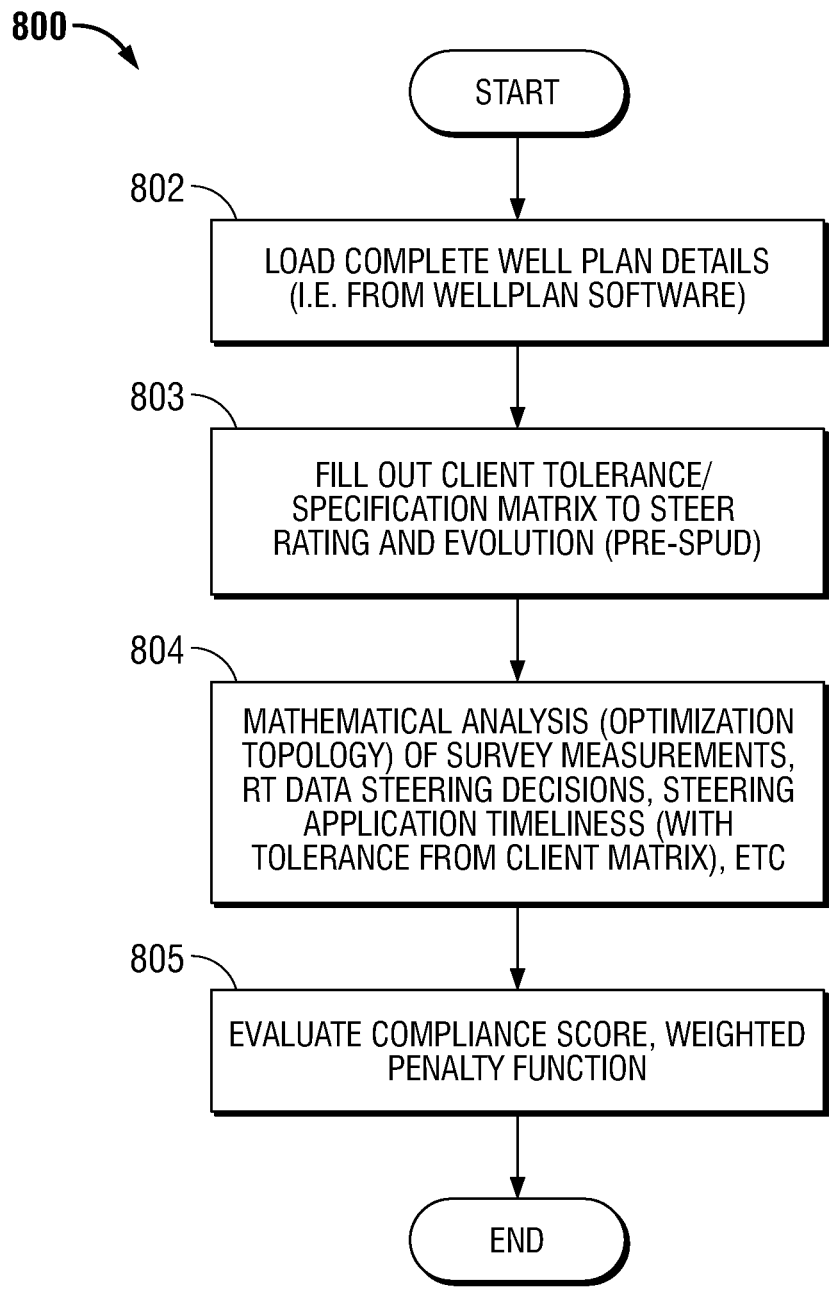
FIG. 8 is an exemplary drilling trajectory evaluation process of the dynamic scorecard according to the disclosed embodiments.

FIG. 8 illustrates operation of the drilling trajectory evaluation module 308 of the dynamic scorecard application via a flow diagram 800. Operation of this evaluation module begins with loading the complete well plan details at block 802, for example, from the well planning software. The dynamic scorecard application then proceeds to block 803 where it fills out the customer/client's tolerance/specification matrix to steer rating and evaluation. In block 804, the dynamic scorecard application may perform a mathematical analysis (such as optimization topology) of survey measurements, real time data, steering decisions, steering application time lines, and similar parameters. In block 805, the directional driller's performance is compared against the data imported by the dynamic scorecard application in blocks 802-804 and the dynamic scorecard application evaluates his compliance and provides a way to tell the function.

Figure 9:
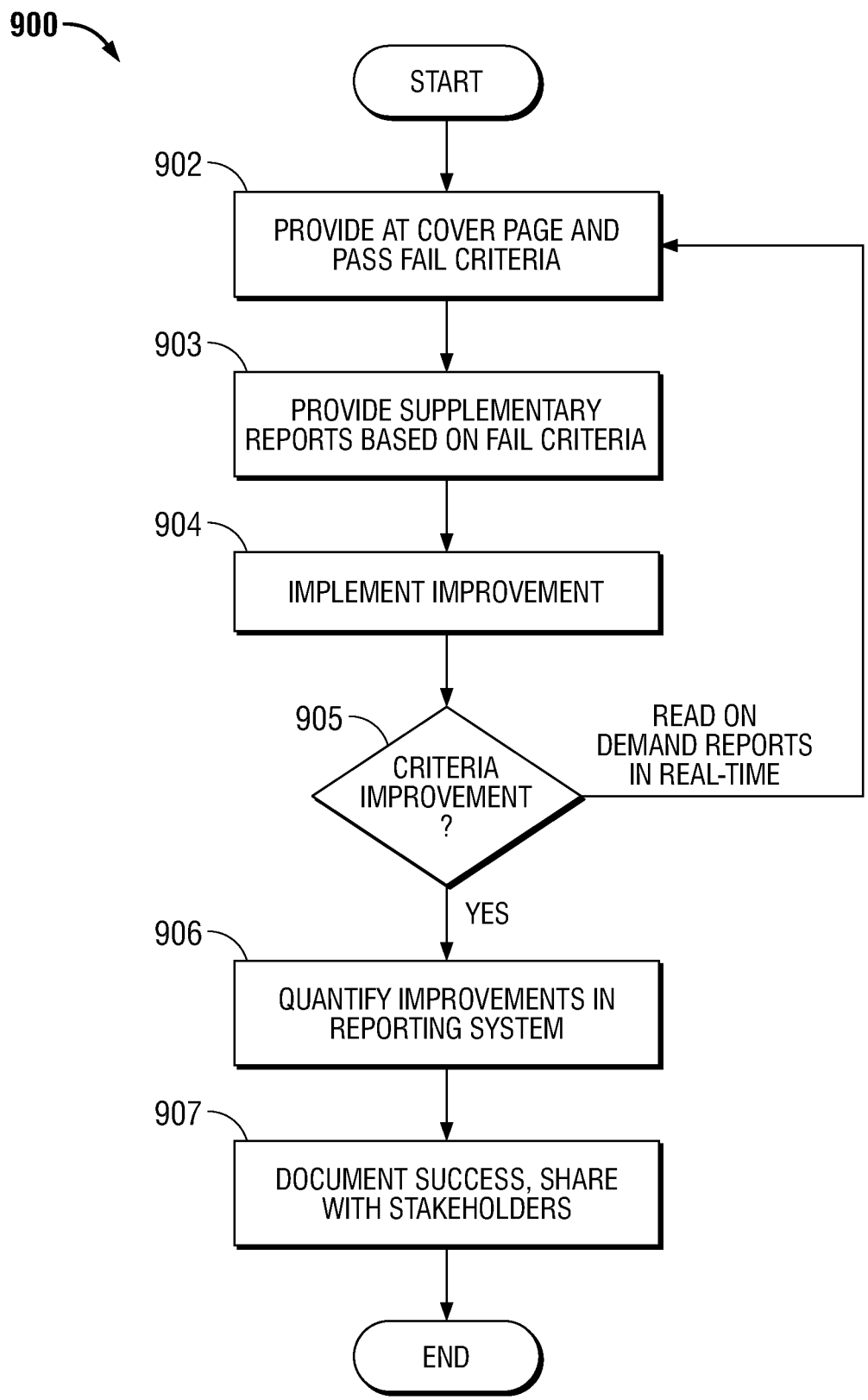
FIG. 9 is an exemplary user review process for the dynamic scorecard according to the disclosed embodiments.

FIG. 9 illustrates operation of the user review module 310 of the dynamic scorecard application via a flow diagram 900. In general, the user review module provides a user with an accurate and objective analysis and evaluation of a directional driller's performance. This evaluation may be shared with other stake holders, such as the purchaser of directional drilling services, and it may also allow for implementing improvements in directional driller training. These improvements may be customized for individual drillers, depending on their needs.

Referring to FIG. 9, in some embodiments, the user review module of the dynamic scorecard application provides a user with a cover page that lists pass/fail criteria for the directional driller at block 902. If any supplementary reports have been created based upon failed criteria, these may be provided to the user at block 903. Such an arrangement allows the end user to review the pass/fail criteria on the cover page and then select supplementary reports for failed criteria only as needed. Moreover, the real-time nature of the evaluation process described in embodiments disclosed herein facilitate detection and correction of a driller's performance before the directional driller may run afoul of a customer/client's specifications. For example, if the data from the drilling environment indicates that the directional driller is proceeding in a way that, if not corrected, will fail to meet a customer/client's requirement for trajectory, then the dynamic scorecard application may alert the directional driller supervisor on a real time basis. The directional driller's supervisor may then review the report created by the dynamic scorecard application, analyze exactly which parameters are in jeopardy, and contact the directional driller with instructions on corrective actions, all before the customer's specifications/requirement matrix is violated. This review is made of the supplementary report based on failed criteria, if any, for the directional driller. In block 904, the dynamic scorecard application may identify and implement improvements to improve the directional driller's performance in the future. In block 905, the dynamic scorecard application determines whether there should be additional improvement criteria, based on the real-time, on-demand report, and the like provided by the dynamic scorecard application. If so, blocks 902-904 are reiterated. If not, the dynamic scorecard application proceeds to block 906 where it quantifies any improvements. In block 907, success by the directional driller is documented and may be shared with stake holders and other interested parties.

Turning now to FIG. 10, an example of a dynamic scorecard 1000 for a directional driller is shown that may be generated using the systems and methods described herein. More specifically, only the main page of the dynamic scorecard 1000 is seen in FIG. 10, with subsequent pages being generated on demand to support any fail (or pass) criteria that may be listed on the main page. As mentioned earlier, initially generating only the main page instead of all available pages provides a reviewer with quick processing at a glance. Thereafter, the reviewer need only read those supporting pages that are of interest.

In the example of FIG. 10, information in the exemplary scorecard 1000 may be grouped into a number of related or logical sections. For this example, the scorecard 1000 includes a header information section 1002, a global drilling tolerance limits section 1004, a local drilling tolerance limits section 1006, a customer tolerance limits section 1008, and a well specific requirements section 1010. Within a given section are a number of fields or parameters that are relevant to the section, identified by codes and parameter names, as well as the pass/fail criteria for each parameter where applicable, along with an indication whether the directional driller passed or failed each parameter. For example, the customer tolerance limits section 1008 includes an ROP rotating parameter, an ROP sliding parameter, a surge and swab parameter, a steering to plan parameter, and the like. The header information section 1002, on the other hand, includes information about the directional driller and the well and not any parameter.

Figure 11:
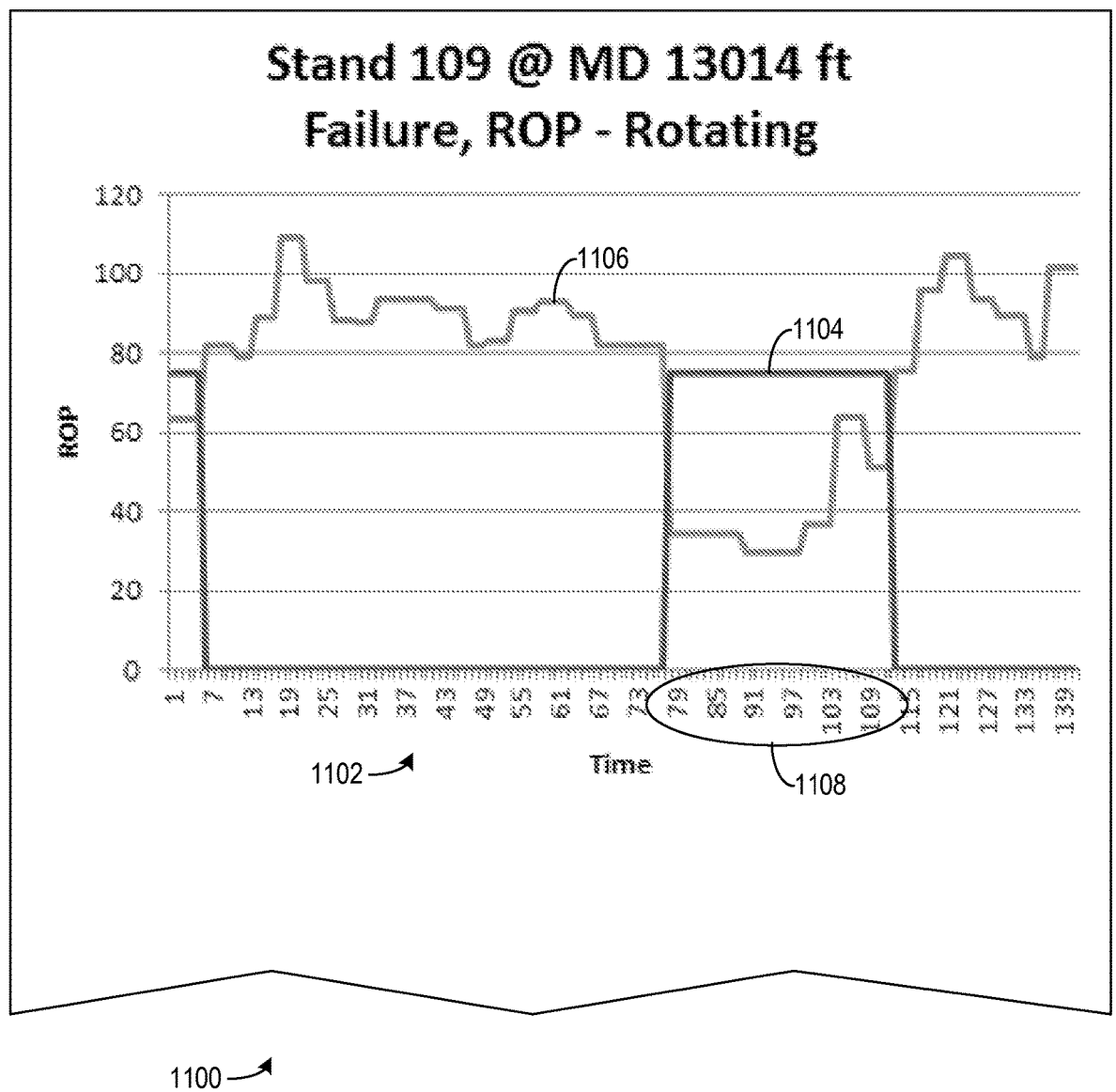
FIG. 11 is an exemplary support page for the dynamic scorecard according to the disclosed embodiments.

Clicking or otherwise selecting one of the parameters, for example, the failed ROP rotating parameter 1012, brings up a detailed support page 1100 for that parameter, an example of which is shown in FIG. 11. In this example, the support page 1100 includes, among other things, a graph 1102 showing how the directional driller performed with respect to the selected parameter. This particular graph 1102 charts the ROP (vertical axis) versus time (horizontal axis), with line 1104 representing expected ROP based on real-time data acquired as described above, and line 1106 representing actual ROP as achieved by the directional driller. As can be seen, during the timeframe indicated at 1108, the actual ROP line 1106 fell below the expected ROP line 1104. Accordingly, the directional driller is given a fail for this parameter on the dynamic scorecard 1000.

While specific details about the above embodiments have been described, the descriptions are intended merely as example embodiments and are not intended to limit the structure or implementation of the disclosed embodiments. For instance, although many other internal components of the system are not shown, those of ordinary skill in the art will appreciate that such components and their interconnection are well known.

In addition, certain aspects of the disclosed embodiments, as outlined above, may be thought of as "products" or "articles of manufacture" typically in the form of executable code and/or associated data that is carried on or embodied in a type of tangible non-transitory machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the executable code.

Additionally, the flowchart and block diagrams in the figures illustrate the architecture, functionality, and operation of possible implementations of systems, methods and computer program products according to various embodiments of the present disclosure. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As set forth above, the embodiments disclosed herein may be implemented in a number of ways. In general, in one aspect, the disclosed embodiments are directed to a computer-implemented method for directional drilling. The method comprises, among other things, the steps of generating a set of directional driller performance criteria reflecting actions taken by a directional driller in performing directional drilling, and acquiring data in real time from data systems at a well location reflecting the status of a plurality of directional drilling tasks. The method additionally comprises the steps of generating a set of customer/client specifications corresponding to the directional drilling tasks, modifying at least one directional drilling parameter in the set of customer/client specifications based on the data acquired in real time from the well location. The method further comprises the steps of comparing the set of customer/client specifications with the modified at least one directional drilling parameter to the set of directional driller performance criteria, evaluating a compliance of the directional driller based on the comparison, and generating a compliance report reflecting the compliance of the directional driller.

In general, in another aspect, the disclosed embodiments are directed to a system for directional drilling. The system comprises, among other things, a plurality of sensors configured to measure drilling parameters at a well location, and a data storage component configured to store real-time data from the plurality of sensors, the data including a status of a plurality of directional drilling tasks the system further comprises a directional driller performance storage component configured to store a set of directional driller performance criteria in a memory accessible by the system, the set of directional driller performance criteria reflecting actions taken by a directional driller in performing directional drilling, and a customer/client specification component configured to store a set of customer/client specifications corresponding to the plurality of directional drilling tasks in a memory accessible by the system. The customer/client specification component is configured to store a modified set of customer/client specifications in the memory, the modified set of customer/client specifications including at least one directional drilling parameter that has been modified based on the real-time data from the well location. The system is configured to compare the modified set of customer/client specifications to the set of directional driller performance criteria, evaluate a compliance of the directional driller based on the comparison, and generate a report reflecting the compliance of the directional driller.

In general, in yet another aspect, the disclosed embodiments are directed to a non-transitory computer memory having a computer program stored thereon. The computer program causes a computer to perform a series of actions, including generating a set of directional driller performance criteria reflecting actions taken by a directional driller in performing directional drilling, and acquiring data in real time from data systems at a well location reflecting the status of a plurality of directional drilling tasks. The computer program further causes the computer to generate a set of customer/client specifications corresponding to the directional drilling tasks, and modify at least one directional drilling parameter in the set of customer/client specifications based on the data acquired in real time from the well location. The computer program further causes the computer to compare the set of customer/client specifications with the modified at least one directional drilling parameter to the set of directional driller performance criteria, evaluate a compliance of the directional driller based on the comparison, and generate a compliance report reflecting the compliance of the directional driller.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the spirit and scope of the exemplary disclosed embodiments as defined in the appended claims.

What is claimed is:

1. A method for directional drilling, comprising:
   mounting one or more sensors on a drill string at locations that allow the sensors to provide real-time data indicating a trajectory of the drill string;
   performing directional drilling using the drill string and the one or more sensors, the directional drilling comprising a plurality of directional drilling tasks performed by a given directional driller, the one or more sensors providing real-time data indicating the trajectory of the drill string to data systems at a well location;
   generating, by a CPU executing a dynamic scorecard application, a set of directional driller performance criteria reflecting actions taken by the given directional driller in performing the directional drilling;
   acquiring, by the CPU executing the dynamic scorecard application, data in real time from the data systems at a well location reflecting the status of the plurality of directional drilling tasks and the trajectory of the drill string, the data collected from multiple sources and the dynamic scorecard application time aligning the data by changing a timestamp for data from one source based on a timestamp for data from another source so data from different sources are correlated by time;
   generating, by the CPU executing the dynamic scorecard application, a set of customer/client specifications corresponding to the directional drilling tasks, the customer/client specifications including a rotating rate of penetration (ROP) parameter, a sliding ROP parameter, a surge and swab parameter, and a steering-to-plan parameter;
   modifying, by the CPU executing the dynamic scorecard application, at least one directional drilling parameter in the set of customer/client specifications based on the data acquired in real time from the well location;
   comparing, by the CPU executing the dynamic scorecard application, the set of customer/client specifications with the modified at least one directional drilling parameter to the set of directional driller performance criteria;

evaluating, by the CPU executing the dynamic scorecard application, a compliance of the given directional driller based on the comparison;

generating, by the CPU executing the dynamic scorecard application, a compliance report reflecting the compliance of the given directional driller, the dynamic scorecard application stating on the compliance report whether the given directional driller exceeds, meets, is below, or is far below expectations based on the compliance of the directional driller for each customer/client specification, wherein for each modified directional drilling parameter in the set of customer/client specifications the compliance of the directional driller is evaluated based on the modified parameter rather than the corresponding previously unmodified parameter in the set of customer/client specifications; and issuing, by the CPU executing the dynamic scorecard application, an alert in real time if the compliance report indicates the given directional driller is performing one or more of the plurality of directional drilling tasks in a way that, if not corrected, will fail to meet the customer/client specifications with respect to the trajectory of the drill string.

2. A method as in claim 1, wherein the set of directional driller performance criteria includes performance standards reflecting the directional control, health-safety-environmental (HSE), well control, and trajectory control for the well location.

3. A method as in claim 2, wherein the acquired data comprises survey data, including at least one of: hole depth, bit depth, surface RPM, flow rate, hookload, block position, stand pipe pressure, top drive torque, weight on bit, and differential pressure.

4. A method as in claim 2, wherein the acquired data comprises measurement while drilling (MWD) or logging while drilling (LWD) data, including at least one of: survey inclination, survey azimuth, survey depth, magnetic toolface, gravity toolface, vibration, gamma measurements, pressure while drilling, sonic measurements, resistivity measurements, nuclear measurements, and downhole fluid measurements.

5. A method as in claim 1, wherein evaluating the compliance of the directional driller further comprises evaluating by the CPU executing the dynamic scorecard application actions taken by the directional driller based upon one or more of: directional driller report, company representative reports, mud engineer data, geologist reports, well plans, offset well data and seismic data.

6. A method as in claim 1, further comprising generating by the CPU executing the dynamic scorecard application a report containing penalty functions corresponding to an actual performance of the directional driller.

7. A method as in claim 6, wherein the report is generated by the CPU executing the dynamic scorecard application only if the actual performance of the directional driller fails to meet the set of directional driller performance criteria.

8. A system for directional drilling comprising:

a plurality of sensors configured to measure drilling parameters at a well location;

a drill string operable to perform directional drilling, the directional drilling comprising a plurality of directional drilling tasks performed by a given directional driller, the plurality of sensors being mounted on the drill string at locations that allow the sensors to provide real-time data indicating a trajectory of the drill string;

a data storage component configured to store real-time data from the plurality of sensors, the data including a status of the plurality of directional drilling tasks and the trajectory of the drill string, said data collected from multiple sources and the system time aligning the data by changing a timestamp for data from one source based on a timestamp for data from another source so data from different sources are correlated by time;

a directional driller performance storage component configured to store a set of directional driller performance criteria in a memory accessible by the system, the set of directional driller performance criteria reflecting actions taken by the given directional driller in performing the directional drilling;

a customer/client specification component configured to store a set of customer/client specifications corresponding to the plurality of directional drilling tasks in a memory accessible by the system, the customer/client specifications including a rotating rate of penetration (ROP) parameter, a sliding ROP parameter, a surge and swab parameter, and a steering-to-plan parameter;

wherein the customer/client specification component is configured to store a modified set of customer/client specifications in the memory, the modified set of customer/client specifications including at least one directional drilling parameter that has been modified based on the real-time data from the well location; and wherein the system is configured to compare the modified set of customer/client specifications to the set of directional driller performance criteria, evaluate a compliance of the given directional driller based on the comparison, wherein, for each modified directional drilling parameter in the modified set of customer/client specifications the compliance of the directional driller is evaluated based on the modified parameter rather than the corresponding previously unmodified parameter in the set of customer/client specifications, generate a report reflecting the compliance of the given directional driller, mark on the report whether the given directional driller exceeds, meets, is below, or is far below expectations based on the compliance of the given directional driller for each customer/client specification, and issue an alert in real time if the report indicates the given directional driller is performing one or more of the plurality of directional drilling tasks in a way that, if not corrected, will fail to meet the customer/client specifications with respect to the trajectory of the drill string.

9. A system as in claim 8, wherein the set of directional driller performance criteria includes performance standards reflecting the directional control, health-safety-environmental (HSE), well control, and trajectory control for the well location.

10. A system as in claim 9, wherein the acquired data comprises survey data, including at least one of: hole depth, bit depth, surface RPM, flow rate, hookload, block position, stand pipe pressure, top drive torque, weight on bit, and differential pressure.

11. A system as in claim 9, wherein the acquired data comprises measurement while drilling (MWD) or logging while drilling (LWD) data, including at least one of: survey inclination, survey azimuth, survey depth, magnetic toolface, gravity toolface, vibration, gamma measurements, pressure while drilling, sonic measurements, resistivity measurements, nuclear measurements, and downhole fluid measurements.

12. A system as in claim 8, wherein the system is further configured to evaluate actions taken by the directional driller based upon directional driller report, company representative reports, mud engineer data, geologist reports, well plans, offset well data and/or seismic data.

13. A system as in claim 8, wherein the system is further configured to generate a report containing penalty functions corresponding to an actual performance of the directional driller.

14. A system as in claim 13, wherein the system is configured to generate the report only if the actual performance of the directional driller fails to meet the set of directional driller performance criteria.

\* \* \* \* \*